Feb. 20, 1973   R. MOREIRA   3,716,989
ROTARY JET TWIN-PROPULSION ENGINE
Filed March 24, 1971   6 Sheets-Sheet 5
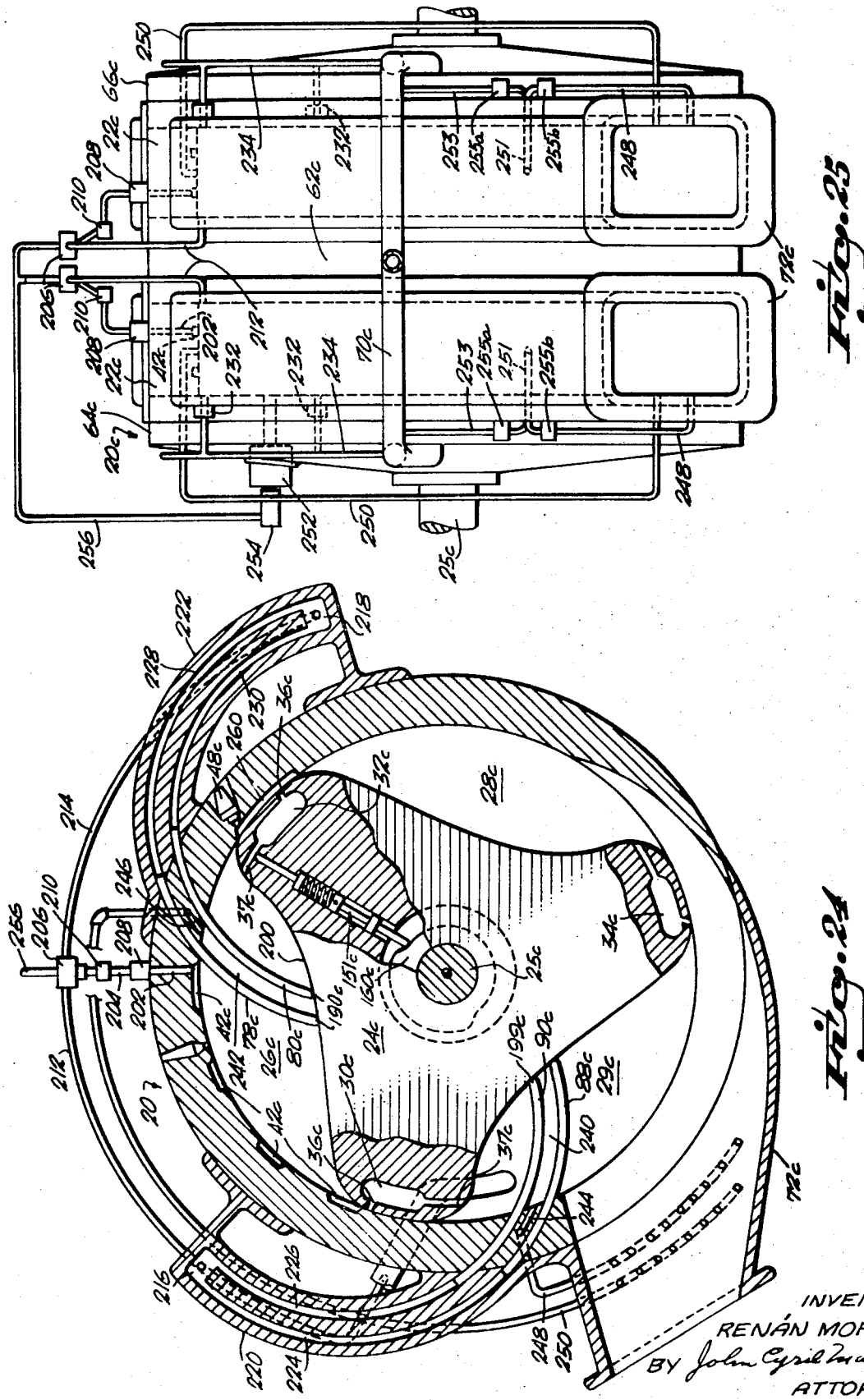
INVENTOR.
RENÁN MOREIRA
BY John Cyril Malloy
ATTORNEY.

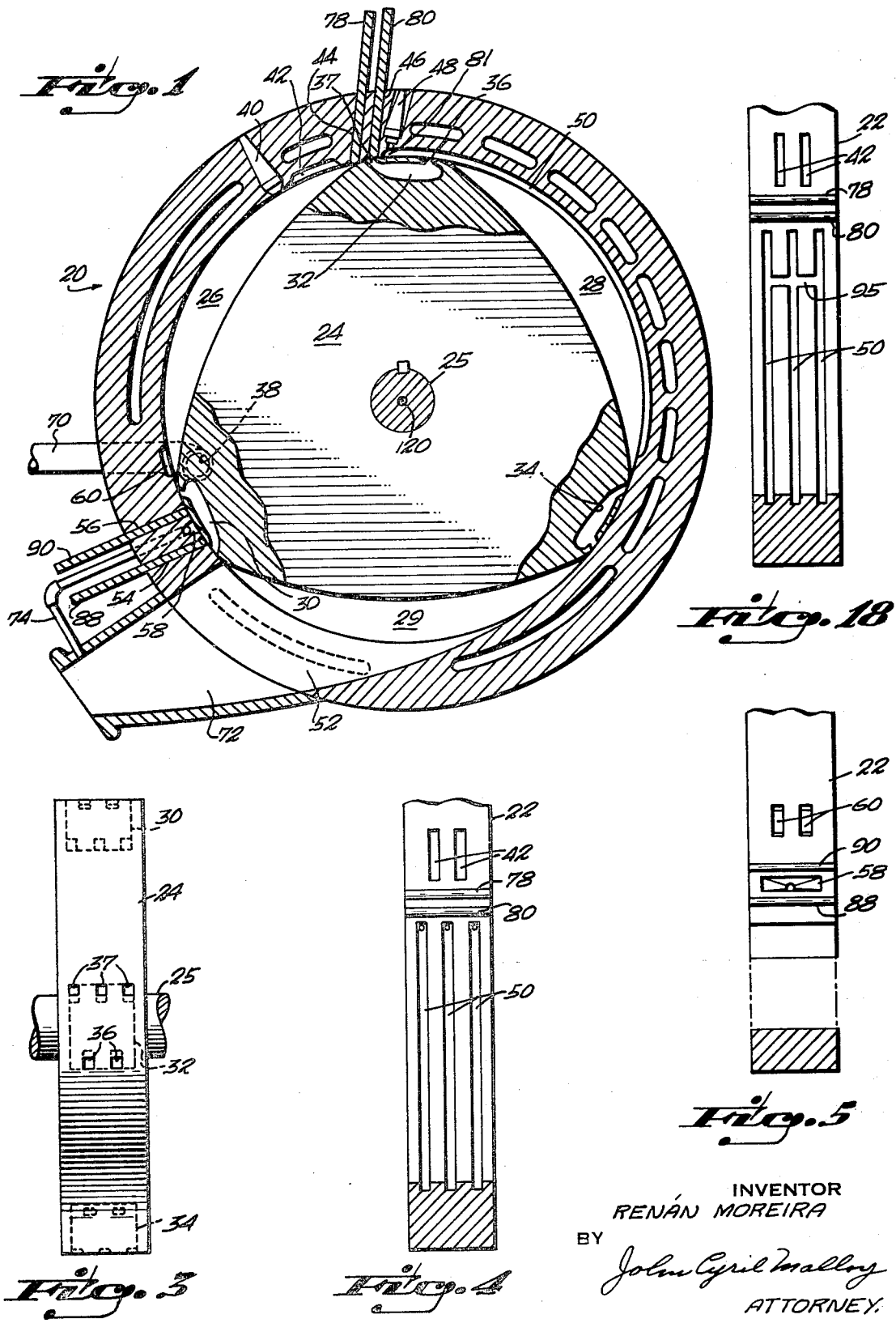

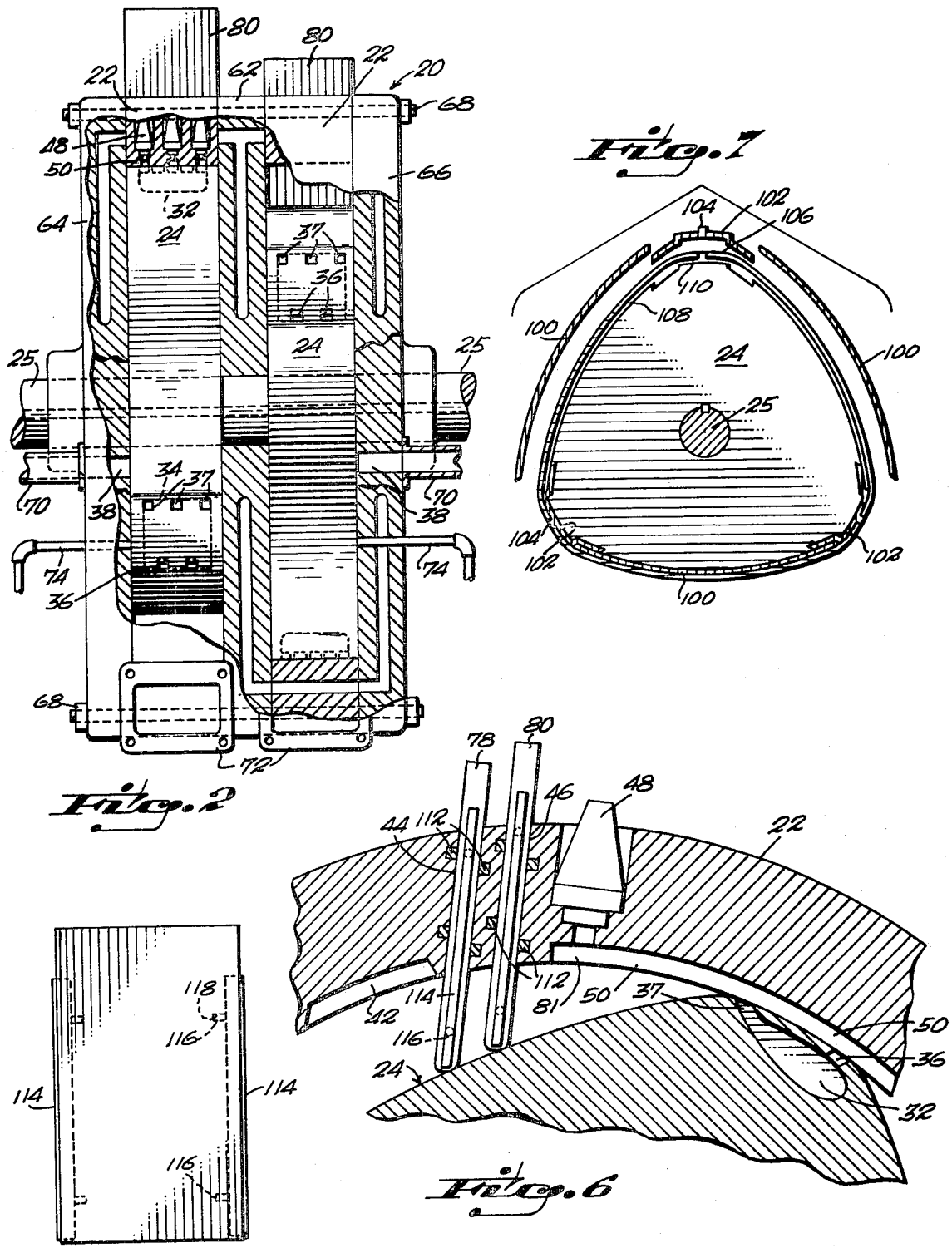

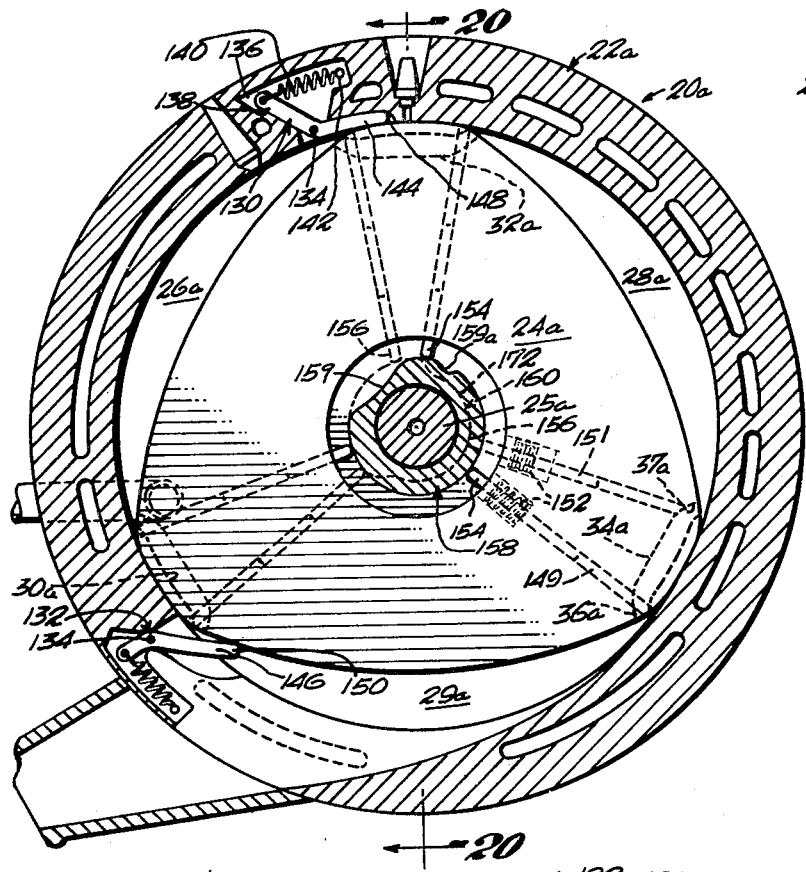
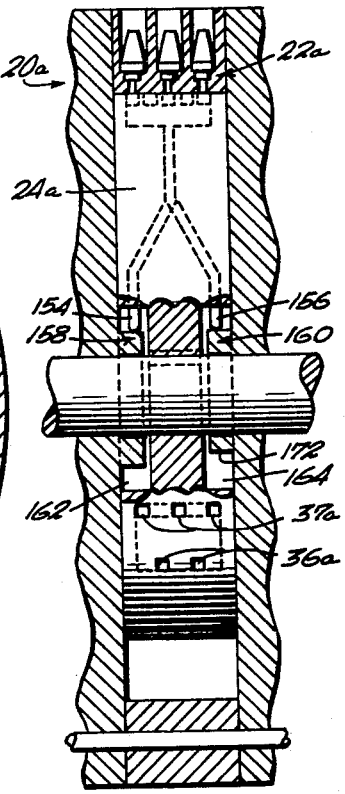
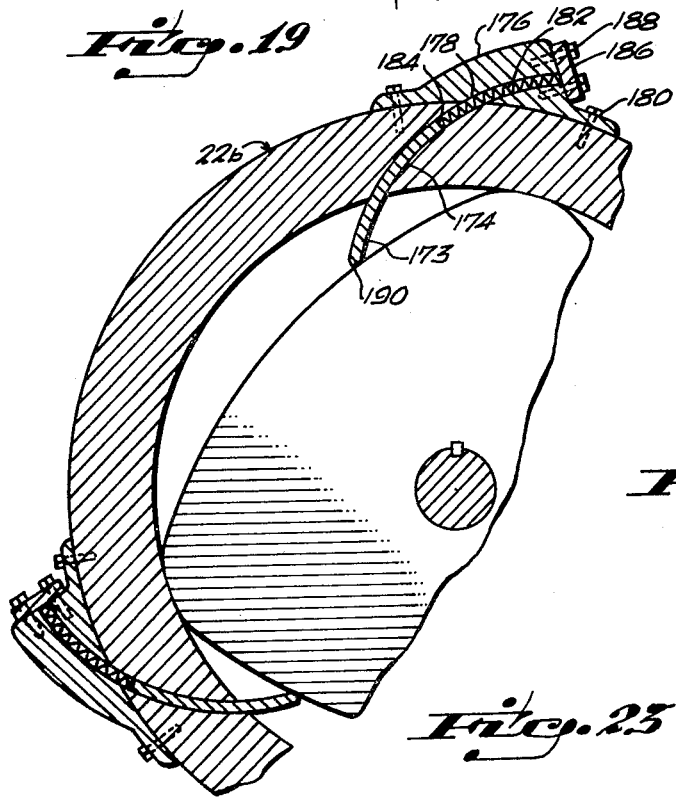
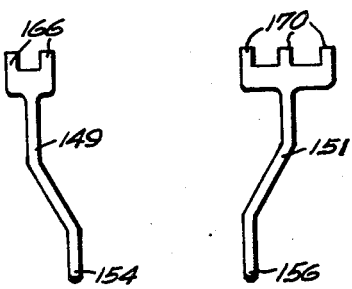

United States Patent Office 3,716,989
Patented Feb. 20, 1973

3,716,989
ROTARY JET TWIN-PROPULSION ENGINE
Renan Moreira, 3727 SW. 8th St.,
Coral Gables, Fla. 33134
Filed Mar. 24, 1971, Ser. No. 127,523
Int. Cl. F02c 3/16; F02b 53/04
U.S. Cl. 60—39.34
26 Claims

ABSTRACT OF THE DISCLOSURE

This invention pertains to an internal combustion engine of the rotary type which provides two force components, jet thrust and expansion forces to, in effect, provide an engine within an engine. One or more cam-rotors are provided in a housing including stators for each cam-rotor. Each cam-rotor includes one or more lobes, provided with jet combustion chambers, and is configurated to provide peripheral compression, expansion and exhaust chambers within the stator. Inwardly and outwardly sliding vanes are at all times urged against the peripheral face of each cam-rotor to cooperate with a lobe thereof to compress a mixture of air and fuel which is fed into the compression chamber. After the mixture is fully compressed it is transmitted into the combustion chamber within a lobe for subsequent firing when the rotational movement of the cam-rotor positions said combustion chamber in the area of a firing means within the expansion chamber. After the firing occurs, the expanding gases rush from the combustion chamber through jet ports to provide jet thrust forces within the expansion chamber and the sliding vanes provide a blocking means whereby the expansion forces in the expansion chamber combine with the jet thrust forces to react against the trailing portion of the lobe to drive the cam-rotor in its predetermined direction of rotation.

---

This invention pertains to an internal combustion engine of the rotary type and provides two force components, jet thrust and expansion forces, both of which occur within an expansion chamber to provide in effect an engine within an engine, to produce the power of two engines with the fuel consumption of one engine.

In the instant invention, the compressing and firing of the fuel charge occurs in chambers between the peripheral face of a cam-rotor and a housing comprised of a stator and end plates in bolted together assembly. When more than one cam-rotor is utilized, a stator is provided for each and a center divider plate is provided between each pair of cam-rotors, all of the rotors being fixed to a common shaft which is rotatably journaled in the end plates.

Each cam-rotor preferably includes three generally equally spaced lobes, each providing an arcuate face portion rotatable in very close proximity to the inner annular face of its associated stator and three arcuate face portions connecting between the respective lobe faces in a manner so as to provide compression, expansion and exhaust chambers between the cam-rotor and the stator.

Each lobe is provided with at least one cavity comprising a jet combustion chamber and after the air and fuel is fed into the compression chamber it is compressed and fed into one of the jet combustion chambers through transferral admission ports communicating between transferral slots in the stator and the jet combustion chamber. The compressed air and gas mixture within the jet combustion chamber is fired creating a jet thrust force through jet ports into the expansion chamber creating secondary expansion forces therein.

One of the principal objects of the present invention is, therefore, to provide an engine providing two force components producing the power of two engines with the fuel consumption of only one engine.

Another object of this invention is to provide an engine characterized by its low exhaust emission, by its ability to produce thrust during the exhaust stage, by its tolerance of retarded ignition and low compression ratio, by the absence of vibration, self-cooling ability, high thermal efficiency, high expansion ratio, continuous combustion, high volumetric efficiency and by its ability to operate on a variety of inexpensive fuels.

Yet another object of the instant invention is to provide an engine having the above mentioned characteristics having a relatively few simply constructed parts and yet combining the principles of the jet and rotary engines within one single engine.

Still another object of this invention is to provide power operated vanes slidably piercing the housing in a manner so as to be in engagement with the peripheral face surfaces of the cam-rotors at all times to form a blocking means between the compression, expansion and exhaust chambers.

Another object of the present invention is to provide a very durable engine having low manufacturing and maintenance costs.

In the drawings:

FIG. 1 is an end view in vertical cross section of the engine of the present invention;

FIG. 2 is a front view partially in section of the engine illustrating two cam-rotors on a common shaft;

FIG. 3 is a front elevational view of one of the cam-rotors as seen in FIG. 2;

FIG. 4 is a detailed view of a portion of the upper segment of the inner wall of the stator illustrating the admission and jet thrust grooves therein;

FIG. 5 is a detailed view of the exhaust segment of the inner wall of the stator;

FIG. 6 is an enlarged, fragmentary view of the upper portion of FIG. 1 illustrating optional seal means for the blocking vanes;

FIG. 7 is an exploded view illustrating the side face of a cam-rotor and optional seal means and mounting slots in said side face;

FIG. 8 is a face view of one of the blocking vanes illustrating the application of lateral seal means thereto;

FIG. 18 is a view similar to FIG. 4 illustrating a modified form of the jet thrust grooves;

FIG. 19 is a view similar to FIG. 1 illustrating a modified form of the engine of the present invention;

FIG. 20 is a vertical sectional view taken along the line 20—20 of FIG. 19;

FIGS. 21 and 22 are detailed views of spring loaded reciprocating rods that open and close the respective admission and jet exhaust ports in the combustion chambers of the cam-rotors in the modification of FIG. 19;

FIG. 23 is a fragmentary view similar to FIG. 19 illustrating another modification of the engine;

FIG. 24 is a view similar to FIGS. 1 and 19 illustrating a still further modified form of the invention;

FIG. 25 is a front elevational view of the modification illustrated in FIG. 24;

Figure 9:
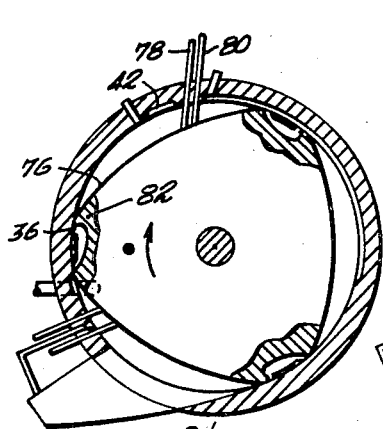
FIGS. 9 through 17 are schematic views illustrating the operations and functions performed during each rotation of a cam-rotor.

Referring more particularly to the drawings wherein like reference characters designate like or corresponding parts throughout the different views, and referring particularly to FIGS. 1 and 2, 20 designates generally a housing including two stators 22, provided with respective concentric cam-rotors 24, fixed to a common shaft 25, each cam-rotor defining a compression chamber 26, an expansion chamber 28 and an exhaust chamber 29 within its respective stator. Each cam-rotor is preferably provided with three lobes, each containing a combustion chamber 30, 32 and 34 with each combustion chamber having one or more compression transferral admission ports 36 and two or more jet thrust ports 37.

Each stator 22 is provided with one or more side air intake ports 38, a fuel injector 40, one or more compression transferral slots 42, two or more blocking vane guide-slots 44 and 46 between the compression and expansion chambers, two or more spark plugs 48, two or more combustion jet grooves 50, an exhaust port 52, two or more blocking vane slots 54 and 56 between the exhaust and compression chambers, one primary suction-scavenging slot 58 and one or more secondary suction-scavenging slots 60. The stators 22 are separated by a center plate 62 and the stators, center plate and end plates 64 and 66 are bolted together in assembly as indicated by the numeral 68 in FIG. 2. Inlet pipes 70 let air or a mixture of air and fuel into the compression chambers 26 through the side ports 38 in the end plate 64 and 66. Burnt gases are exhausted through the exhaust port 52 and exhaust manifold 72. The exhaust manifold 72 is connected by means of a small diameter exhaust-scavenging pipe 74 to the primary suction-scavenging slot 58.

Two pairs of spring loaded blocking vanes 78, 80 and 88, 90 are slidably engaged in the respective pairs of guide slots 44, 46 and 54, 56, the vanes 78 and 80 comprise the partition between the compression and expansion chambers and the vanes 88 and 90 comprise the partition between the exhaust and compression chambers.

Figure 10:
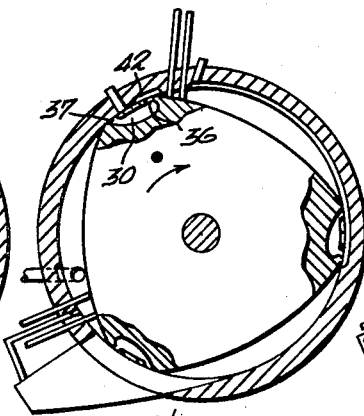
Figure 11:
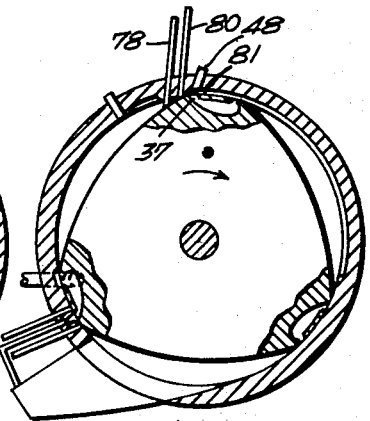
Figure 12:
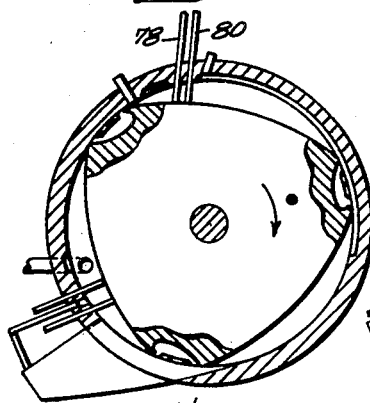
Figure 13:
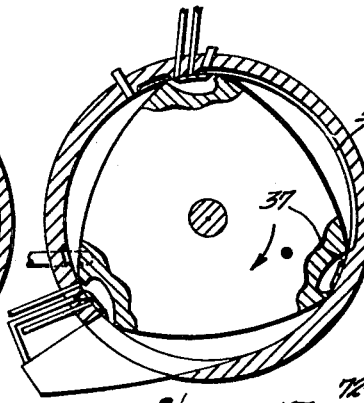
Figure 14:
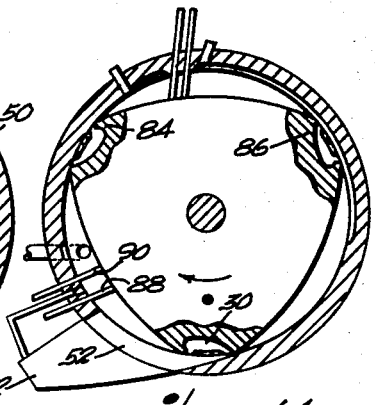
Figure 15:
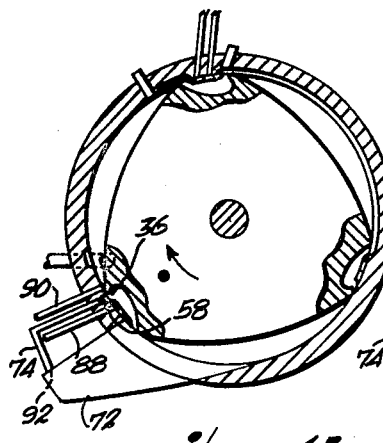
Figure 16:
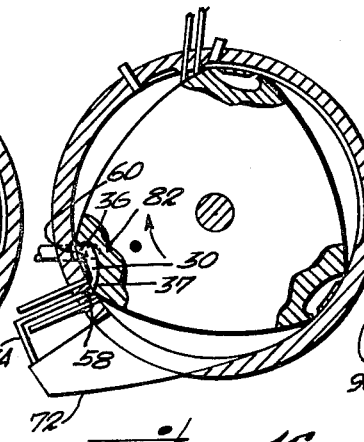
Figure 17:
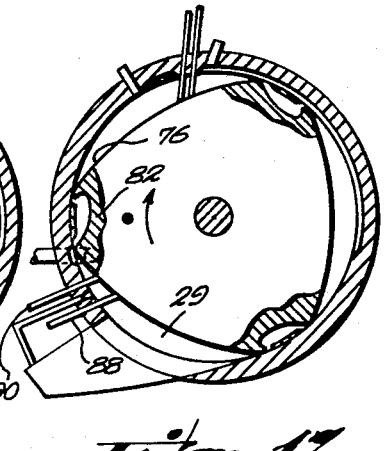

As illustrated in FIG. 9, in operation, air or a mixture of air and fuel is compressed by one of the leading faces 76 of one of the cam-rotor lobes against the blocking vanes 78 and 80, which are slidably engaged in the slots 44 and 46 between the compression and expansion chambers, until the head of lobe 82 rotatingly reaches the position where said lobe's combustion chamber admission slots 36 align with the stator's transferral slots 42 as seen in FIG. 10. As the cam-rotor lobe continues to rotate the compressed air-fuel mixture is forced through the transferral slots 42 into the combustion chamber 30 wherein the compressed mixture travels past the now retracted blocking vanes 78 and 80 until the jet chamber's trailing jet thrust ports 37 align with the ends 81 of the stator's combustion jet grooves 50, as illustrated in FIG. 11. At this point, the spring-loaded blocking vanes 78 and 80, which double as timing rods, actuate the spark plugs 48 igniting the compressed mixture, which, finding itself confined in all directions except that of the jet thrust ports 37, has all expanding forces escaping through the jet thrust ports 37, thereby producing jet thrust generally perpendicular to the cam-rotor's radius and in the direction opposed to the direction of rotation. As illustrated in FIG. 12, this causes the cam-rotor lobe 82 to rotate as the gases jetting from the chamber 30 exhaust and expand into the power harnessing expansion chamber 28 formed between the trailing face of the lobe 82 and the now penetrated blocking vanes 78 and 80 producing additional power as the burning gases exert pressure within the expansion chamber, providing additional rotational force to the lobe until the jet thrust ports 37, as seen in FIG. 13, reach the end of the jet combustion grooves 50 which extend about 100 degrees about the inside diameter of the stator. At this point, jetting is blocked as the jet thrust ports 37 are sealed and jetting temporarily terminates, but expansion continues for about 20–30 degrees more, after which expansion is completed and as seen in FIG. 14, exhaust starts. At this point the jet chamber's jet thrust ports 37 are again exposed, permitting the remaining burning compressed gases within the jet chamber 30 to have a final productive thrusting stage, producing power during the exhaust stage. This additional jet power is sufficient to cause the leading lobe 84 to complete its compression stage without needing the power of the trailing or third lobe 86 which is now producing power by its jet thrust and expansion forces, thereby permitting this engine to have a very high percentage of net useful double-power. At the same time the spring loaded blocking vanes 88 and 90 which are slidably engaged in slots 54 and 56, between the exhaust and compression chambers, start penetrating to force the burnt gases to exhaust through the exhaust port 52. As the lobe 82 approaches the end of the exhaust chamber, at about 235 degrees, as seen in FIG. 15, the blocking vanes 88 and 90 are retracted and as the admission ports 36 of the jet chamber 30 on lobe 82 pass the first of the two blocking vanes 88, the rotor's admission ports 36 align with the stator's primary suction slot 58 at about 240 degrees. At this point, as the stream of exhaust gases escaping through the exhaust manifold 72 rushes past the opening 92 of the suction exhaust pipe 74 connecting with the primary suction slot 58, suction forces partially scavange, partially vacuum and partially cool the combustion chamber 30. As the loge moves about 12 degrees further, FIG. 16, the trailing jet ports 37 of the combustion chamber 30 in lobe 82 align with the primary suction slot 58 just vacated by the leading admission ports 36 and the admission ports 36 begin to align with the fresh air transferring secondary slots 60, thereby providing a passage between the fresh air or mixture in the jet combustion chamber, received through the admission port 38, and the exhaust manifold 72 by way of the pipe 94, permitting momentary and additional scavenging of the compression chamber 30 whose previously created partial vacuum, aided by the suction power from the manifold draws air backwards through the jet combustion chamber 30, continuing to scavenge and cool said chamber 30 while at the same time injecting the fresh air into the engine's exhaust system to improve the emission control qaulities of this engine. As the lobe rotates an additional five to seven degrees, as seen in FIG. 17, the blocking vanes 88 and 90 start penetrating, sealing the lobe 82 from the trailing exhaust chamber 29 while the lobe's leading face 76 starts its new compression stage. Upon completion of the second compression and transferral stage, the lobe's jet thrust ports 37 again align with the stator's jet combustion grooves 50 and the compressed mixture is instantly ignited by the flame of the preceding burning charge through said grooves 50 and combustion follows thereafter without requiring the spark of a plug or the use of expensive fuels.

For the purpose of illustration in FIG. 2, the compression transferral grooves 42, and the compression admission ports 36 appear to be formed in a common plane with the combustion jet grooves 50 and the jet thrust ports 37. However, in considering FIG. 3, which is a peripheral face view of a rotor 22, in combination with FIG. 4, which is a fragmentary inner peripheral face view of the stator, it becomes apparent that the two admission ports 36 and the three jet thrust ports 37 in all three of the lobes 30, 32 and 34 are in respective staggered vertical planes and the two compression transferral grooves 42 in all of the lobes are in respective vertical planes in common with the admission ports 36. In like manner the three jet thrust ports 37 in all of the lobes are in respective planes in common with the combustion jet grooves 50.

FIG. 18 illustrates a modification in the combustion jet grooves 50 to include a transverse groove 95 joining between all three jet grooves 50. This transverse groove 95 is positioned relative to the jet grooves 50 so that when the jet thrust ports 37 are rotated to the position illustrated in FIG. 11, in alignment with the ends 81 thereof, the transverse groove 95 is momentarily aligned with the two admission ports 36 to permit the flame from the preceding expansion charge to fire the incoming charge through the grooves 95 and 50 and the ports 36.

FIG. 5 is an inner peripheral face view of the stator in the exhaust chamber and illustrates that the two secondary scavenging slots 60 are in respective planes common to the two admission ports 36 while the single primary scavenging slot 58 is positioned transversely in the inner stator wall and is of a width to align with all of the ports 36 and 37.

Piston engines, as well as the present rotary engines tend to leave some unburned gas at the end of the power phase. This engine burns the mixture completely because of the jetting-expanding action, because of the high turbulence created by the blocking vanes, by the compression, and "transferral," because of the intercommunication between the expansion chamber 28 and the exhaust chamber 29 through the stator jet grooves 50, because no oil is burned and carbon formation is small, because of the final jetting action during the exhaust phase and by this engine's ability to operate at low compression ratio with retarded ignition and lean mixture. This engine's emission is further reduced by feeding the rotor chambers from dual side ports. Its manifold can be fitted with a heat riser for pre-heating of the incoming air or air and fuel mixture which would permit still leaner settings. Further emission control is achieved because of the injection of additional fresh air into the combustion chamber, through the inner peripheral stator scavenging slots 58 and 60, while scavenging the jet chambers 30. Instead of letting a mixture of air and fuel enter the compression chamber 26 directly through the dual ports 38, fresh air only can be admitted, with the fuel being injected later directly into the compression chamber 26 through a stator located fuel injector 40, located as far forward as possible within the compression chamber 26. Thermal efficiency is very high because of the series of thrust-expansion and final thrust power phases. This engine is a pure rotary, without orbital or planetary movement of the rotor or eccentric shaft and thus has no balancing or inertia problem. Turbine-like rotor speeds plus high volumetric and thermal efficiencies plus the combination of jet and expansion forces, give it exceptional power-to-weight ratio.

This engine can be operated with a relatively low compression ratio because of its efficient power extraction ability, as it produces thrust and expansion power out of the same fuel mixture, followed by an additional thrust during the exhaust period. In addition, since the rotors are perfectly symmetrical and operate within a perfectly round stator, with a common center shaft, frictions are reduced considerably. Further, since the compression vanes 78, 80, 88, 90 may also act as timers operating the essential engine accessories such as fuel pump (or injection), ignition, oil pump and water pump, the reduction of the number of shaft-gear operated accessories further reduce power waste. This engine is free of the pressure reversal effect. Two or more sparks may be timed by the blocking vanes to fire alternately to cope with the possible demand for frequency of sparks while starting. No sparks are required once the engine starts. The plugs can be made to fire at slightly different timings by having each plug fired independently by each of either pair of blocking vanes which, because of the shape of the cam-rotor and their slight distance apart, offer timing differential qualities, permitting more suitable and variable timing.

Sealing in this engine should not be necessary since the perfect roundness of the stator, the perfectly symmetrical rotor and balanced operation would permit a close tolerance of about 0.004 of an inch. The pressure of the spring-loaded blocking vanes against the rotor surface seals this surface between phases. Dimpled plates on the lobe flanks would further reduce leakage. The dimpled plates on the lobe flanks obligate the compressed gas to expand into each undulation before it gets to the next one, so leakage is slowed. The chambers and cavities need no lubrication because there is no wiping contacts.

However, if sealing is found to be preferred in practice, FIGS. 6, 7 and 8 illustrate sealing possibilities. The cam-rotors' flanks can be sealed as shown in FIG. 7 with lateral sweeping seals 100 which overlap with the lobe head seals 102. The lobe head seals 102 have seal tips 104 which extend from the seals' outer periphery to the outer periphery of the rotor lobe head 106 in order to completely separate the flanks of one chamber from another. The seals 100 and 102 are seated in respective grooves 108 and 110. FIG. 6 shows the positions of the stator mounted blocking vane seals 112 which seal the forward and rear faces of the vanes' guide slots 44 and 46. FIG. 8 shows the blocking vanes' lateral seals 114 which seal the flanks of the compression, expansion and exhaust chambers. The blocking vanes' lateral seals 114 have two or more internally extending pins 116 which fit into respective cavities 118 in the vanes 78, 80, 88 and 90 to prevent the seals from moving out of place while in motion. The cam-rotor's outer surface and the stator's inner surface are automatically sealed by the spring-loaded vanes.

Cooling of both the cam-rotor and the stator is partially accomplished during combustion by the strange behavior of a moving jet of compressed gas when it strikes a surface obliquely, as confirmed by experiments carried out at the Rensselaer Polytechnic Institute of Troy, N.Y. As the gases jet out of the jet chamber and into the power harnessing expansion chamber, the jet of gases strikes the inner surface of the stator within each combustion stator groove 50, causing one strong forward cooling stream and one weak rear hot stream. As the hot stream travels in the same direction, at the same speed together with the jet chamber lobe, the hot stream is exhausted before it can add heat within the combustion chamber while the relatively cooled strong forward stream jets into the expansion chamber, keeping it at a relatively low temperature. Further cooling is accomplished by conventional means, water-cooling the stators and housing, oil-cooling the rotor and the stator areas around the blocking vanes' guide-slots. Rotor motion is used to force oil through the shaft's center oil bore 120 to hot spots, particularly around the jet combustion chambers 30 within the rotor. The same oil that lubricates the shaft bearings and side seals cools the rotor, blocking vanes and guide-slots and is fed by an ordinary oil pump and led out to an oil radiator when hot. The motion of the rotor forces the oil to the extremities where it is most needed, so no high-pressure pump is required. Water collant flow is threaded back and forth through the rotor housing. Large passages are used to slow down coolant flow where little cooling is needed, and narrow passages speed up coolant flow where extra heat dispersal is required.

Rotor housing wear, due to this engine's symmetry and particularly if no seals are involved, where rotor and stator actually do not touch, can be regarded as negligible, even if seals are used. In the latter case, chrome-plating or metal-spray coating, presently in use, could be applied for additional resistance to wear.

In the foregoing description, one single center plate is discussed and the one single plate, for simplicity, does not show air (or air and fuel mixture) intake; however, two or more center plates can be used as the power of the engine is increased by adding cam-rotors and, air (or air and fuel mixture) is to be admitted to both sides of each expansion chamber (through the center plates and end caps), without departing from the spirit of this invention.

FIGS. 19 through 22 illustrate a somewhat modified form of the instant invention which will be described structurally insofar as it differs from the first form. This modification provides a housing 20a including a stator 22a and a three lobed cam-rotor 24a generally forming peripheral compression, expansion and exhaust chambers 26a, 28a and 29a within the stator.

In this form, the transferral grooves 42, combustion jet grooves 50, and the primary and secondary scavenging slots 58 and 60 are eliminated.

The blocking vanes 78, 80 and 88, 90 of the first form are replaced by a pair of spring loaded bell crank levers 130 and 132 which perform the same functions as said vanes. Each bell crank is fulcrumed on a pin 134 in an appropriate cavity 136 provided in the stator 22a and includes an inner arm 138, the distal end of which is connected to one end of a tension spring 140, the other end of the spring being connected to an anchor pin 142 fixed in the stator. The outer arms 144 and 146 of the respective bell cranks 130 and 132 comprise the blocking vanes and are elongated and are provided with rounded ends 148 and 150 which are at all times spring urged into engagement with the peripheral face of the cam-rotor 22a. The outer arms 144 and 146 are of a width substantially equal to the width of the peripheral face of the cam-rotor and therefore perform the function of providing a blocking means between the compression and expansion chambers and the exhaust and expansion chambers.

As best illustrated in FIG. 19, the admission ports 36a and the jet thrust ports 37a, of the compression chambers 30a, 32a and 34a in the lobes, open directly into the compression, expansion and exhaust chambers. Spring loaded, reciprocating, cam actuated rods 149 and 151 are provided for opening and closing the respective ports 36a and 37a in each cam lobe.

Both rods 149 and 151 are radially extended through appropriate openings through the cam-rotor and are spring urged inwardly by compression spring means 152, mounted in the cam-rotors, whereby the respective inner ends 154 and 156 of the rods 149 and 151 are held in engagement with respective static cams 158 and 160 which are fixed to the end plates or partitions of the housing 20a. Both side faces of the cam-rotor are provided with respective annular cavities 162 and 164 to receive the cams 158 and 160 for engagement by the ends 154 and 156 of the rods.

As best illustrated in FIG. 21, the reciprocating rod 149 is provided with a pair of upwardly extending fingers 166 at its uper end which are spaced apart a distance, so as to be slidably engageable through appropriate slots intersecting both admission ports 36a. As illustrated in FIG. 19, the inner end 154 of the rod 149 is in engagement with a high portion of the cam 158 whereby the fingers 166 are held in their radially extended positions thereby closing the admission ports 36a.

The cam 158 is provided with a primary low portion 159 which is positioned to permit the rod 149 to be retracted during the final phase of the compression stroke of the lobe to provide for admission of the compressed fuel and air mixture into the lobe combustion chamber 30a through admission ports 36a.

A secondary, short low 159a is provided on the cam 158 which is positioned relative to blocking arm 144 and jet thrust ports 37a to momentarily open the admission ports 36a to permit firing of the compressed mixture in the combustion chamber by the flame of the previous charge after the jet thrust ports have passed beyond the end 148 of the arm 144.

FIG. 22 illustrates a reciprocating rod 151 which provides three upwardly extending fingers 170 which function relative to the three jet thrust ports 37a in the same manner as described relative to the rod 149 and the admission ports 36a. The cam 160 is provided with one elongated low portion 172 which opens the jet thrust ports 37a throughout the jet thrust and expansion, and the exhaust phases of the operation of the engine, after which the cam actuates the rod 151 to close the jet thrust ports during the compression stage.

FIG. 23 illustrates a further modified form of blocking means between the compression and expansion, and the exhaust and compression chambers. As both blocking means are duplicates of each other, they will be described in the singular.

Each blocking means comprises an arcuate vane 173 of substantially the same width as the peripheral face of the cam-rotor and of a length such that a portion thereof will at all times remain in a companionate arcuate slot 174 extending through the rotor 22b. A housing 176, containing an extension 178 of the arcuate slot 174, is bolted as at 180 to the outside periphery of the stator 22b, and a compression spring 182 is provided in the extension 178, exerting compression forces on the arcuate vane between the outer end 184 thereof and an end plate 186 fixed by bolt means 188 over the open outer end of the arcuate extension 178. The arcuate vane is, therefore, held at all times with its inner end 190 in engagement with the peripheral face of the cam-rotor to provide a blocking partition between a pair of chambers.

A still further modified form of the rotary engine of the present invention is illustrated in FIGS. 24 and 25 which includes a housing 20c, end plates 64c and 66c, a center partition 62c, and a pair of stators 22c. The cam-rotors 24c are mounted within the stators on a common shaft in the same manner as described relative to the first form of the invention to form compression, expansion and exhaust chambers 26c, 28c and 29c.

The cam-rotors 24c are configured somewhat differently, each providing a concave peripheral face surface 200, connecting between the concentric arcuate face surfaces of two lobes, to provide a more efficient expansion power. The combustion chambers 30c, 32c and 34c in the respective lobes are provided with compression admission ports 36c which are normally sealed against the inner peripheral face of the stator 22c except during the latter portion of the compression stage when the compressed fuel and air mixture is forced into the lobe's combustion chamber 30c through transferral admission grooves 42c formed in the inner stator wall in the same manner as in the first form of the invention. As illustrated in FIG. 24, additional sets of the peripherally spaced transferral admission grooves 42c may be provided in the inner peripheral wall of the stator to provide a gradual transfer of the compressed mixture to the jet combustion chamber as the compression stage progresses. The additional grooves provide a smoother operating engine, additional turbulence and a reduced resistance to compression.

The jet thrust ports 37c open directly into the compression, expansion and exhaust chambers in the same manner as described relative to FIG. 19 except that they are directed substantially perpendicular to the center radius of the lobe.

Spring loaded reciprocating rod means 151c and cam means 160c similar to that described relative to FIGS. 19, 20 and 22 are utilized to close the jet thrust ports 37c during the compression stage and to open said ports 37c during the expansion and exhaust stages.

Arcuately penetrating pairs of blocking vanes 78c, 80c and 88c, 90c similar to the vanes described relative to FIG. 23 are utilized, however, the springs are omitted and pneumatic operating means are provided to hold the inner ends 190c in engagement with the peripheral face of the cam-rotor at all times during operation of the engine.

A port 202 is provided radially through each stator wall which communicates between the leading end of the transferral admission grooves 42c and a conduit 204 terminating in a distribution block 206. A relief valve 208 and a check valve 210 are provided in the conduit 204. From the distribution block 206 conduits 212 and 214 communicate with chambers 216 and 218 in the outer ends of a pair of housings 220 and 222, fixed to the outer surface of the stator 22a. The housings 220 and 222 are provided with arcuate pairs of continuation slots 224, 226 and 228, 230 similar to the spring carrying continuation slots 178 as described relative to FIG. 23. The continuation slots 224, 226 and 228, 230 are provided for slidable engagement by the pairs of arcuate blocking vanes 78c, 80c and 88c, 90c during their continual penetrating and receding movements while following the contour of the cam-rotor 24c.

The chambers 216 and 218 communicate with the outer ends of the respective pairs of slots 224, 226 and 228, 230 provided for the arcuate vanes 78c, 80c and 88c and 90c. During the compression stage, a mixture of compressed air and gas passes to all of the slots 224, 226, 228 and 230 via the compression transferral grooves 42c, port 202, conduit 204, distribution block 206, conduits 212 and 214 and the chambers 216 and 218. In this manner compression forces are exerted on all of the arcuate vanes to hold their inner ends 190c in engagement with the outer peripheral face of the cam-rotor 24c. As the compression stage is completed and the arcuate vanes 78c, 80c and 88c, 90c start to recede and exhaust, relief valves 232, FIG. 25 release part of the pressure, permitting the arcuate vanes to reach their maxium retracted positions. Relief valves 232, communciating with the chambers 216 and 218 prevent a buildup of excess pressure during reversal of the blocking vanes and prevent loss of pressure in the compression chamber 26c.

In order to eliminate backlash torque when stopping the engine, means, such as a solenoid controlled valve (not shown) closes the intake manifold 70c, supplying the air, or air, fuel mixture, when the engine is switched off and conduit means 234, communicating between the intake manifold 70c, relief valves 232 and chambers 216 and 218 is provided whereby suction forces are created in the chambers 216 and 218 which hold the blocking vanes in their retracted positions. The suction forces are created in the compression chambers by the last rotational movement of the cam-rotors, after switch off, when a new charge of a fuel and air mixture is not fed into said compression chambers.

As illustrated in FIG. 24, the spaces 240 and 242 between the pairs of blocking vanes 78c, 80c and 88c, 90c are vented to the exhaust manifold 72c by means of respective vent ports 244 and 246 communicating with said manifold 72c via conduits 248 and 250. As illustrated in FIG. 25, fresh air from the intake manifold 70c is restored to the spaces 240 and 242 between the pairs of blocking vanes by means of respective restoration ports 251 communicating with said intake manifold 70c via conduits 253, each intake and exhaust conduit being equipped with respective check valve 255a and 255b.

To start the engine when equipped with the pneumatic actuation means for the blocking vanes, an electric motor 252 connected to a small compressor 254 is provided. The compressor is connected to the distribution blocks 206 by a conduit 256 and when the motor 252 is energized, pressure is built up in the chambers 216 and 218 to move the blocking vanes 78c, 80c and 88c, 90c into engagement with the peripheral faces of the cam-rotors 24c. Means, not illustrated, may be provided to automatically drivingly engage the electric motor to the fly wheel of the engine, when the pressure has been built up, to start the engine. For example, a pressure actuated switch can be provided whereby any conventional type of drive engagement means is operated to drivingly engage the electric motor 252 to the fly wheel of the engine.

The engine illustrated in FIGS. 24 and 25 is provided with a firing means such as the spark plug 48c for the initial firing and with an arcuate advanced ignition groove 260 in the inner peripheral face of stator 22c. The arcuate ignition groove 260 provides momentary communication between the expansion chamber 28c and the transferral admission ports 36c of the combustion chamber, such as 32c, as the cam-rotor 24c rotates, thereby permitting the flame from the previous charge to ignite the charge in said combustion chamber.

Figure 26:
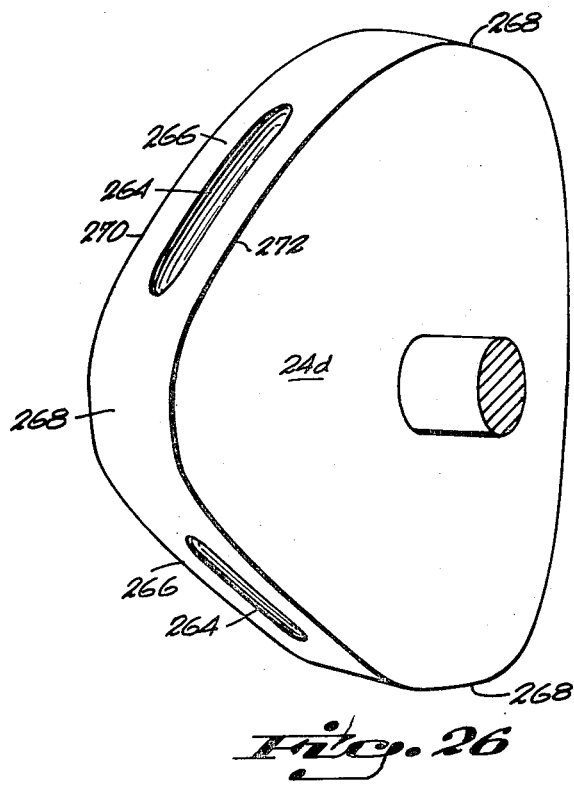
FIG. 26 is a perspective views of a cam-rotor illustrating a manner of grooving the peripheral face surface thereof to provide a more efficient expansion power.
Figure 27:
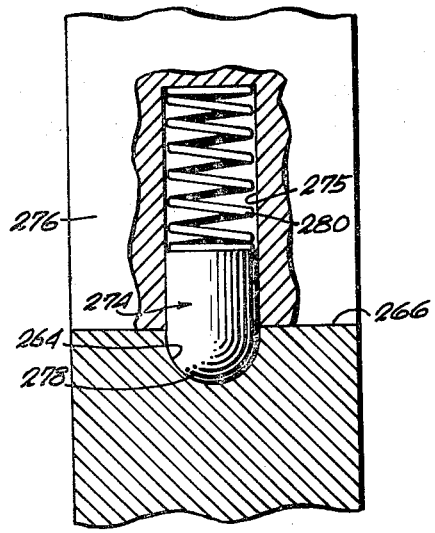
FIG. 27 is a fragmentary sectional view illustrating the application of a spring loaded tongue to the blocking vanes of the engine for use with a groove cam-rotor as illustrated in FIG. 26.

The modification in FIGS. 26 and 27 provides a groove 264 in each of the peripheral face areas 266 connecting between respective adjoining lobe face areas 268 of a cam-rotor 24d. The grooves 264 extend a predetermined distance along each face 266, midway between the side edges 270 and 272 thereof, to provide for a more efficient expansion power stage.

FIG. 27 illustrates a spring loaded tongue 274, slidingly mounted in a bore 275 in the inner end of a blocking vane 276, providing an outer end portion 278 which is configurated to conform with the cross sectional configuration of a groove 264 along its entire length. A compression spring 280 in the bore 275 maintains the tongue 274 in tight engagement with the surface of the groove 264.

It is understood and intended that the drawings and the foregoing descriptions are illustrative and not limiting, and it is recognized that departures may be made therefrom within the scope of the invention, which is, therefore, not to be limited to the details disclosed therein, but is to be accorded the full scope of the claims so as to embrace any and all equivalent apparatus and articles.

What is claimed is:
1. An internal combustion engine of the rotary type comprising,
(A) a housing including,
 (1) a pair of opposed end plates providing opposed inner walls,
 (2) stator means providing a round inner cylindrical chamber having a predetermined radius and width and an inner cylindrical wall,
 (3) fastening means fixing said opposed end plates and stator means in assembly with said stator means in assembly with said stator means sandwiched in between said end plates;
(B) a cam-rotor means having a predetermined direction of rotation and providing compression, expansion and exhaust stages during each revolution, and a drive shaft, said cam-rotor means being fixed to said drive shaft interiorly of said inner cylindrical chamber, said drive shaft being concentric with said inner cylindrical chamber and extending outwardly through said end plates and being rotatably journaled therein, said cam-rotor means providing,
 (1) a peripheral wall,
 (2) opposed parallel side walls spaced apart a distance so as to respectively lie in close proximity to said opposed inner walls,
 (3) lobe means comprising the "high" of said cam-rotor and providing a minor portion of said peripheral wall which is arcuately concentric with said drive shaft and having a radius such that said "high" is freely rotatable in very close proximity to said inner cylindrical wall, said minor portion terminating in rounded leading and trailing edges,
 (4) jet thrust combustion chamber means provided with,
  (a) compression admission port means adjacent said leading edge,
  (b) a plurality of jet thrust ports adjacent said trailing edge in a staggered relation to said compression admission port means;
 (5) a major portion of said peripheral wall, spaced inwardly from said inner cylindrical wall, forming the "low" of said cam-rotor and the leading and trailing walls of said lobe means which respectively merge and connect with said rounded leading and trailing edges,
(C) first and second movable blocking means, spaced apart a predetermined distance, which are mounted in said stator means and provide an inner edge and and an outer portion;
(D) yieldable, inwardly directed force applying means against said outer portion providing for inward and outward movement of both of said blocking means whereby, during operation of the engine, said inner edges is held in constant sealing contact with said cam-rotor peripheral wall;

(E) peripheral compression, expansion and exhaust chambers formed in said inner cylindrical chamber, between said inner cylindrical wall and said major portion of the peripheral wall, by said first and second blocking means and lobe means which form separations between the respective chambers;

(F) fuel supply and air supply means communicating with said compression chamber;

(G) compression transferral means, adjacent said first blocking means, whereby the compressed fuel and air mixture is transferred from said compression chamber to said jet combustion chamber, via said compression admission port means, at the end of the compression stage during which said fuel and air mixture is compressed by said leading wall as it moves toward said first blocking means while rotating in said predetermined direction;

(H) firing means to ignite said fuel and air mixture in said jet combustion chamber immediately after the trailing wall of the lobe means moves past said first blocking means to provide combustion within said jet combustion chamber, said firing means comprising a plurality of spark plugs with respective openings in firing communication, respectively, with said plurality of jet thrust ports, adjacent to the beginning end of said expansion chamber;

(I) means for closing said compression admission port means and means for opening said jet thrust port means whereby expansion forces created by said combustion provide jet thrust forces through said jet thrust port means into said expansion chamber to provide a first component of force, and expansion forces in said expansion chamber to provide a second component of force, both of which react on said trailing wall to drive said cam-rotor in said predetermined direction of rotation;

(J) exhaust means comprising a peripheral port through said stator, between said compression and exhaust chambers, to the atmosphere through which exhaust gases pass to the atmosphere while said lobe means passes said opening.

2. An internal combustion engine as defined in claim 1 providing at least two cam-rotor means and stator means and a center plate between said cam-rotors and stators, said cam-rotors being fixed to a common drive shaft and said pair of opposed end plates, stators and center plate being fixed in assembly by said fastening means.

3. An internal combustion engine as defined in claim 2 in which each of said cam-rotors is provided with a plurality of lobes, each lobe including a jet combustion chamber, compression admission port means and jet thrust port means whereby a compression, combustion and exhaust stage is provided by each of said lobes during each revolution of said cam-rotor in its predetermined direction of rotation.

4. An internal combustion engine as defined in claim 1 in which said cam-rotor is symmetrically provided with three lobes, each lobe including a segment of said minor portion of the peripheral wall to provide three "highs" and a segment of said major portion providing a "low" between each pair of lobes and leading and trailing walls for each of said lobes.

5. An internal combustion engine as defined in claim 4 in which each lobe includes a jet combustion chamber having a compression admission port means adjacent said leading edge and jet thrust port means adjacent its trailing edge.

6. An internal combustion engine as defined in claim 4 including longitudinally extending groove means in each of said segments of said major portion and spring loaded tongues, having leading ends, carried by said blocking vanes, said leading ends being extendable into and retractable from said grooves as said cam-rotor rotates and being configurated to mate with the cross sectional configuration of said grooves along their entire lengths.

7. An internal combustion engine as set forth in claim 1 including a plurality of sets of compression transfer grooves in said inner peripheral wall which are located in a predetermined peripherally spaced relation within said compression chamber.

8. An internal combustion engine as defined in claim 1 in which said compression admission port means comprises a plurality of admission port openings through said minor wall portion into said jet combustion chamber.

9. An internal combustion engine as defined in claim 8 in which said compression transferral means comprises a plurality of relatively short transferral slots in said inner peripheral wall within said compression chambers which are positioned in common vertical planes respectively with said plurality of admission port openings, said admission port openings communicating with said transferral slots at the end of the compression stage to transfer the compressed air fuel mixture from said compression chamber to said jet combustion chamber.

10. An internal combustion engine as defined in claim 1 including a plurality of elongated jet combustion grooves in said inner peripheral wall extending substantially around said expansion chamber, said plurality of grooves being positioned in common vertical planes respectively with said plurality of jet thrust ports in a staggered relation to said common vertical planes of said admission ports and transferral slots.

11. An internal combustion engine as defined in claim 10 in which said plurality of spark plug openings communicate respectively with said jet combustion grooves adjacent the beginning end of said expansion chamber, said jet combustion grooves, in turn, communicating with said jet thrust ports.

12. An internal combustion engine as defined in claim 11 in which said blacking vanes double as timing rods to fire said spark plugs when said plurality of jet thrust ports are moved into communication with said jet combustion grooves, said jet thrust openings being angled to provide jet forces into said expansion chamber via said jet combustion grooves.

13. An internal combustion engine as defined in claim 1 including an exhaust manifold communicating between said exhaust port and the atmosphere, a transverse primary suction slot in said inner peripheral wall inbetween said second pair of blocking means, and an exhaust conduit means communicating between said primary suction slot and said manifold whereby said jet combustion chamber is exhausted when said compression admission port means are rotated into alignment with said transverse primary suction slot.

14. An internal combustion engine as defined in claim 13 including a secondary suction slot means in said inner peripheral wall, positioned within said compression chamber whereby air in said compression chamber is circulated through said jet combustion chamber via said secondary suction slot means, compression admission port means, jet combustion chamber, jet thrust port means, transverse primary slot, and exhaust conduit means when said compression admission port means is rotated into alignment with said secondary suction slot means.

15. An internal combustion engine as defined in claim 1 in which each of said first and second blocking means comprises a bell crank lever pivotally mounted in a cavity in said stator, said bell crank including a first and a second arm, and a tension spring means in said cavity exerting constant tension on said first arm, which comprises said outer portion, whereby said second arm is constantly urged inwardly to keep said inner edge in contact with said peripheral wall at all times.

16. An internal combustion engine as defined in claim 1 in which said combustion admission port means and jet thrust port means open directly into said compression, expansion and exhaust chambers and providing first and second reciprocating rod means each having an inner end and an outer end comprising finger means, first and second fixed cam means, first and second radially disposed slot means in said cam-rotor to slidably, respectively receive said first and second reciprocating rod means, and compression spring means to maintain said inner ends in respective contact with said first and second fixed cam means at all times, said first radially disposed slot means intersecting said combustion admission port means and said first cam means being configurated to maintain said finger means of said first rod in said intersection to close said admission port means at all times except during the final phase of the compression stage during which said admission port means is opened and momentarily in said expansion chamber when said admission port means is opened to permit firing of the compressed mixture in said combustion chamber by the flame of the previous charge, said second radially disposed slot means intersecting said jet thrust port means and said second cam means being configurated to maintain said finger means of said second rod in said intersection to close said jet thrust port means only during the compression stage.

17. An internal combustion engine as defined in claim 1 in which said first and second sliding blocking vanes are arcuately configurated and providing companionately configurated arcuate slot means through said stator for sliding engagement by said arcuate blocking vanes.

18. An internal combustion engine as defined in claim 17 in which said inwardly directed force applying means comprises compression springs which exert compression forces against said outer portion to hold said inner edge in contact with said peripheral wall of said cam-rotor at all times during operation of the engine.

19. An internal combustion engine as defined in claim 17 in which each of said first and second sliding blocking means comprises a pair of said arcuate blocking vanes, each slidably engaged in one of said arcuate slots, which are relatively closely space, operate in tandem, and provide a space therebetween.

20. An internal combustion engine as defined in claim 19 in which said yieldable, inwardly directed force applying means comprises pneumatic force means directed against said outer portions.

21. An internal combustion engine as defined in claim 20 providing outward, enclosed arcuate extensions of said arcuate slot means and a first conduit communicating between said enclosed extensions and said transferral admission groove means in said compression chamber whereby compressed fuel and air mixture from said compression chamber is directed against said outer portions and including a first relief valve and a check valve in said first conduit.

22. An internal combustion engine as defined in claim 21 including a second conduit, and a second check valve, communicating between said enclosed extensions and said air supply means to release excess pressure from said enclosed extensions into said air supply means.

23. An internal combustion engine as defined in claim 22 including valve means operable when said engine is shut off to close said air intake means.

24. An internal combustion engine as defined in claim 19 including vent and air intake means for said space between said first and second pairs of sliding blocking means.

25. An internal combustion engine as defined in claim 24 in which said vent and air intake means comprise a third and a fourth conduit, said third conduit including a check valve, communicating between said space and said exhaust port to exhaust said space when said blocking vanes are receding, said fourth conduit, including a check valve, communicating between said air supply means and said space to admit air while said blocking vanes are penetrating.

26. An internal combustion engine as set forth in claim 19 including a small electric motor drivingly engaged to an air compressor means, a fifth conduit means communicating between said air compressor and said enclosed arcuate slot extensions, a fly wheel on said drive shaft, drive engaging means between said fly wheel and electric motor and pressure actuated switch means for activating said drive engaging means.

References Cited

UNITED STATES PATENTS

| 1,119,699 | 12/1914 | Houser | 123—8.33 |
| 2,005,141 | 6/1935 | Gutzwiller | 418—249 X |
| 1,319,932 | 10/1919 | Stevenson | 123—8.17 |
| 2,222,183 | 11/1940 | Rocheville | 60—39.34 |
| 3,145,533 | 8/1964 | Ollinger | 60—39.34 |
| 1,039,028 | 9/1912 | Clarke | 418—248 |
| 882,168 | 3/1908 | Rhorer | 418—249 |
| 346,531 | 8/1886 | Chamberlin et al. | 418—249 |

FOREIGN PATENTS

| 562,450 | 10/1932 | Germany | 123—8.33 |
| 1,622 | 1/1911 | Great Britain | 123—8.33 |

ALLAN D. HERRMANN, Primary Examiner

U.S. Cl. X.R.

123—8.07, 8.09, 8.33; 418—185, 248, 249